United States Patent

[11] 3,571,576

[72] Inventor Marion M. Satterfield
Oak Ridge, Tenn.
[21] Appl. No. 766,434
[22] Filed Oct. 10, 1968
[45] Patented Mar. 23, 1971
[73] Assignee The United States of America as represented by the United States Atomic Energy Commission

[54] COMPRESSION OF STATISTICAL DATA FOR COMPUTER TAPE STORAGE
5 Claims, 1 Drawing Fig.

[52] U.S. Cl. .................... 235/92, 307/220
[51] Int. Cl. .................... Ho3k 21/02
[50] Field of Search .................... 307/220; 235/92 (60, 70, 63, 74)

[56] References Cited
UNITED STATES PATENTS
3,348,029 10/1967 Krokar .................... 235/92
3,413,452 11/1968 Schlein .................... 235/92

*Primary Examiner*—Daryl W. Cook
*Assistant Examiner*—Joseph M. Thesz, Jr.
*Attorney*—Roland A. Anderson

ABSTRACT: Circuitry has been provided which compresses statistical data with an error less than one standard deviation to permit recording approximately 500 counts in six levels of one character of a storage tape. Counts are fed into a six-place digital accumulator, the first eight individually, then by threes until the accumulator reaches 16, then by sixes until the accumulator reaches 32, and then by twelves until the six places are full. The information stored in the accumulator can then be read onto conventional magnetic or paper storage tape.

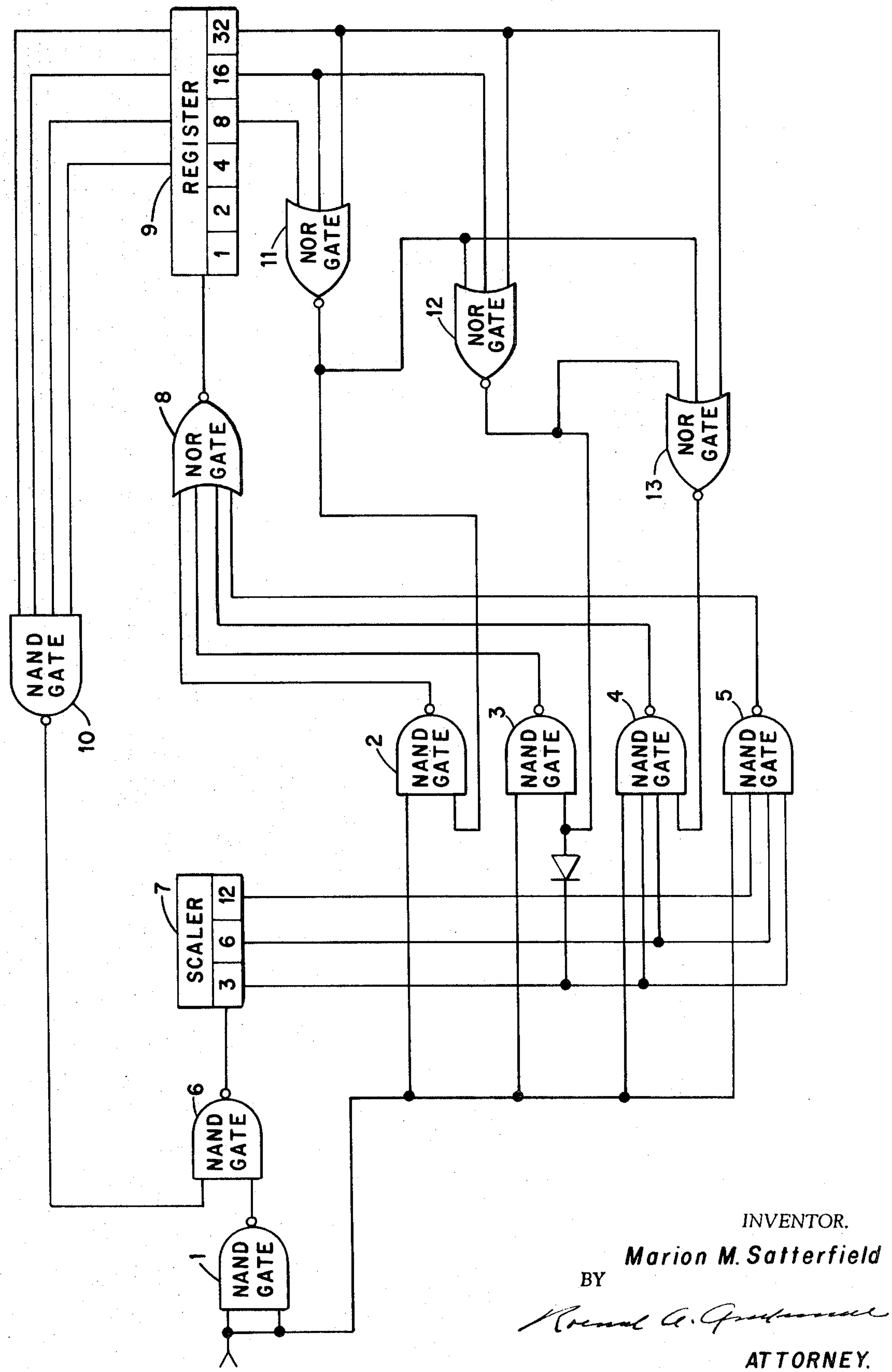
INVENTOR.
Marion M. Satterfield
BY
[signature]
ATTORNEY.

COMPRESSION OF STATISTICAL DATA FOR COMPUTER TAPE STORAGE

BACKGROUND OF THE INVENTION

The present invention was made in the course of, or under, a contract with the U. S. Atomic Energy Commission.

The field of art to which the invention pertains is for data compression systems.

It is becoming conventional practice to utilize computers for the recording and analysis of experimental data. By this means more rapid feedback of results into future experiments is possible. The data may be retained on punched tape, magnetic tape, etc. One such application is the recording of data obtained with a medical radioisotope scanner, and/or a rescanner system such as disclosed in the U.S. application of C. C. Harris et al. Ser. No. 452,951, filed May 3, 1965, now U.S. Pat. No. 3,441,351, issued Apr. 29, 1969. It is desirable to record the data from each traverse of the detector head, or selected portions thereof. The counts recorded in each of the regions may range from a few to several hundred. It is important that the few counts be recorded and that a minimum of tape space be used for the high counts. Accordingly, some form of data compression would be desirable for such systems.

Conventional ½-inch storage tape for computer use has six "levels" or channels in each "character" that may be used for data storage. If a conventional binary scaler register of six channels is used (1-2-4-8-16-32) to place the data on the tape, a maximum of 63 counts may be stored in each character. A much higher total may be stored by using two character positions on the tape; this, of course, requires more tape for the storage of information and a higher speed tape deck for the same storage rate. Extra tape is also used if the length of the accumulation period is decreased so that the number of counts per scan portion does not exceed 63.

In the prior art, one method of data compression is to disregard what would normally be the lower channels and record only from the upper channels of a scaler. While this may be useful in some types of experimental data where the significance of the discarded data is of little value, it is not desirable in obtaining data regarding radioisotope deposition because the lower numbers also carry significant information. Thus there exists a need for another method of data compression that utilizes but a single character position on the storage tape, while at the same time permitting recording up to at least 456 actual counts in compressed form in the one character and making provision for recording the lower numbers such that the overall data is compressed with an error less than one standard deviation.

SUMMARY OF THE INVENTION

With a knowledge of the limitations of the prior art, as discussed above, it is the object of the present invention to provide a data compression system that will meet the need as described above. This object has been accomplished in the present invention by providing a circuit that will permit the recording of individual counts—through eight—and then progressively and automatically utilize scale factors of 3, 6, and 12, as needed, to record up to at least 456 actual counts in compressed form as one character of a computer storage tape. Thus, a compressed count of 60, stored in a binary scaler register of six channels as is done in the present invention, represents an actual count of at least 456 in a manner to be described below.

BRIEF DESCRIPTION OF THE DRAWING

The single FIG. in the drawing is a circuit diagram of a system for the compression of statistical data so as to permit more economical storage on computer storage tape.

DESCRIPTION OF THE PREFERRED EMBODIMENT

A system for accomplishing the above object is shown in the single FIG. of the drawing, wherein positive input pulses from a spectrometry system or other source are impressed upon the inputs to NAND gates 1 through 5. For each input pulse, NAND gate 1 produces a negative pulse which is fed to one input of NAND gate 6. The other input of NAND gate 6 normally allows this gate to send a positive output pulse to a "divide-by-3,-6 or 12" scaler 7 whose operation will be described hereinafter.

If channels 8, 16 and 32 of accumulate register 9 are empty, the output of NOR gate 11 is positive, enabling NAND gate 2 to accept input pulses; this output of gate 11 is also fed to NOR gates 12 and 13, keeping their outputs negative and thereby locking out NAND gates 3 and 4. It is not necessary to lock out NAND gate 5 because this gate will not accept pulses until all outputs of scaler 7 have gone positive (i.e., every 12th input pulse). If NAND gate 2, 3, or 4 should fire simultaneously with NAND gate 5, only one count will be recorded in register 9 because of the presence of NOR gate 8.

Each of the first eight input pulses is accepted by NAND gate 2 which causes NOR gate 8 to produce a positive pulse to register 9. The first eight pulses are accumulated by register 9 as they are presented. When channel 8 of accumulate register 9 is excited, a positive signal is fed to NOR gate 11. This causes the output of gate 11 to go negative, thereby disabling NAND gate 2 as well as releasing the hold on the input of NOR gate 12, allowing the output of NOR gate 12 to go positive. This positive output of gate 12 places a hold on NOR gate 13 and enables NAND gate 3 to accept pulses. At this time only every third input pulse is transmitted to NAND gate 3 due to the control of scaler 7. Every third pulse of the next 21 input pulses is now counted until the stored count in accumulate register 9 reaches 16; this feeds a positive signal to NOR gates 11 and 12, producing negative signals at their outputs. These negative signals disable NAND gates 2 and 3 and also release the hold on NOR gate 13, allowing its output to go positive. This positive output of gate 13 enables NAND gate 4 to accept pulses whenever allowed by scaler 7—that is, at every sixth input pulse. A count is then placed into register 9 for each sixth input pulse.

Thus, every sixth pulse of the next 102 input pulses is counted until the stored count in accumulate register 9 is 32, at which time a positive input is applied to NOR gates 11, 12, and 13, which disables NAND gates 2, 3, and 4. Pulses are then accepted by NAND gate 5 whenever allowed by the scaler 7—that is, at every 12th input pulse. This divide-by-12 scale factor is applied to the next 324 input counts until stored count 60 is reached in the accumulate register 9. When the stored count reaches 60 in the register 9, this count corresponds to an actual count of 456 and up, at which time the register is full. It should be noted that a stored count of 63 is possible if a 6-input NAND gate is substituted for NAND gate 10. In any event, after channels 4, 8, 16, and 32 are filled in register 9, NAND gate 10 produces a negative output which disables NAND gate 6 and thus stops all pulses to scaler 7. This causes accumulate register 9 to hold its count of 60 until it is reset.

In a normal operation of the above-described circuit in its intended use in scanning, an operator preselects the number of increments of a scan sweep. The size of the increment is not ordinarily changed during the total scan. During the scanning operation, counts are accumulated in the register 9 until the end of the given increment and are then recorded as one character on a magnetic or paper tape in a conventional manner. All registers are then reset and counts are accumulated in the next scan increment and recorded as the next character on the tape, etc. until the entire scan is completed. The tape is then a record of the data and may be used in any of the rescanning and other data analysis and plotting systems.

It should be understood that some error is possible in the recorded count total in view of the storage in scaler 7 which is not recorded. Thus, when the scale factor is 3, there may be one count lost; the loss may be up to three counts when the scale factor is 6; and the loss may be as much as six counts when the scale factor is 12. However, since the input is ragged statistical data, this error is not objectionable because it is within one standard deviation.

It should also be understood that the present invention is not limited to the specific circuit arrangement as described above. For example, other scale factors may be utilized for the scaler 7. The scale factors may be inserted at other times; for instance, counts may be recorded one for one until a stored count of 16 is reached at which time desired scale factors may be inserted in a manner similar to that described above. Also, in the event a computer tape with more data bits per character is used, the described circuit may be expanded to allow for more scale factors if this is desired.

This invention has been described by way of illustration rather than of limitation and it should be apparent that it is equally applicable in fields other than those described.

I claim:

1. A system for compression of statistical data for computer tape storage comprising a 6-place digital accumulator, and means for feeding input counts into said accumulator, said means including a scaler and circuit means for permitting the first eight input counts to be recorded individually by said accumulator, for then permitting said scaler to insert a first scale factor of 3 between said input and said accumulator with every third subsequent count being recorded by said accumulator until said accumulator is filled to a first predetermined level, for then permitting said scaler to insert a second scale factor of 6 between said input and said accumulator with every sixth subsequent count being recorded by said accumulator until said accumulator is filled to a second predetermined level, and then finally permitting said scaler to insert a third scale factor of 12 between said input and said accumulator with every 12th subsequent count being recorded by said accumulator until the last four channels of said accumulator are filled, said circuit means including a first, second, third, fourth, and fifth input NAND gate; a sixth NAND gate connected between said first input NAND gate and said scaler; a first NOR gate connected between the outputs of said second, third, fourth, and fifth input NAND gates and said accumulator; said scaler having its scale factor 3 output connected to said third, fourth, and fifth input NAND gates, having its scale factor 6 output connected to said fourth and fifth input NAND gates, and having its scale factor 12 output connected to said fifth input NAND gate, and a second, third, and fourth NOR gate connected between said accumulator and said second, third, and fourth input NAND gates; said second, third, and fourth NOR gates being respectively associated with said first 8-count level, said first predetermined count level, and said second predetermined count level within said accumulator and being connected in such a manner that while said first eight counts are being recorded by said accumulator said second input NAND gate is enabled while said third and fourth input NAND gates are disabled, then while every third subsequent count for the next 21 input counts is being recorded by said accumulator and said first scale factor of three is enabled said third input NAND gate is enabled while said second and fourth input NAND gates are disabled, then while every sixth subsequent count for the next 102 input counts is being recorded by said accumulator and said second scale factor of 6 is enabled said fourth input NAND gate is enabled while said second and third input NAND gates are disabled, and while every 12th subsequent count for the next 324 counts is being recorded by said accumulator and said third scale factor of twelve is enabled said fifth input NAND gate is enabled while said second, third, and fourth input NAND gates are disabled and after the next subsequent count is recorded the accumulator is filled and the stored compressed count becomes 60, which corresponds to an input count of 456.

2. The system set forth in claim 1, and further including a seventh NAND gate connected between said accumulator and said sixth NAND gate such that when the last four channels of said accumulator are filled said sixth NAND gate is disabled to prevent any further pulses from being received by said system.

3. A system for compression of statistical data for computer tape storage comprising a 6-place digital accumulator provided with a single input thereto, and means for feeding input counts into said accumulator by way of said accumulator input, said means including a first circuit means for permitting a first predetermined number of input counts to be recorded and stored individually by said accumulator, said feeding means further including a scaler and a second circuit means associated with said scaler and said accumulator for then permitting said scaler to insert a first scale factor between said input counts and said accumulator input thus effecting one compressed count to be recorded and stored by said accumulator out of each increment of subsequent input counts as set by said first scale factor until said accumulator is filled to a first predetermined level, said second circuit means then permitting said scaler to insert a second scale factor between said input counts and said accumulator input thus effecting one compressed count to be recorded and stored by said accumulator out of each increment of subsequent input counts as set by said second scale factor until said accumulator is filled to a second predetermined level, said second circuit means then permitting said scaler to insert a third scale factor between said input counts and said accumulator input thus effecting one compressed count to be recorded and stored by said accumulator out of each increment of subsequent input counts as set by said third scale factor until the remaining levels of said accumulator are filled, whereby the information now stored in the completely filled accumulator is adapted to be read onto magnetic or paper storage tape.

4. The system set forth in claim 3, wherein said first predetermined number of individual counts is eight, said first scale factor of said scaler is 3 with every third subsequent count recorded and stored by said accumulator, said second scale factor is 6 with every sixth subsequent count recorded and stored by said accumulator, and said third scale factor is 12 with every 12th subsequent count recorded and stored by said accumulator.

5. The system set forth in claim 4, wherein said system includes a third circuit means associated with said accumulator for preventing any further input counts from being received by said system after said accumulator is completely filled.